Aug. 23, 1927.
G. R. FULLER
BRAKE
Filed May 8, 1926
1,640,186
3 Sheets-Sheet 1
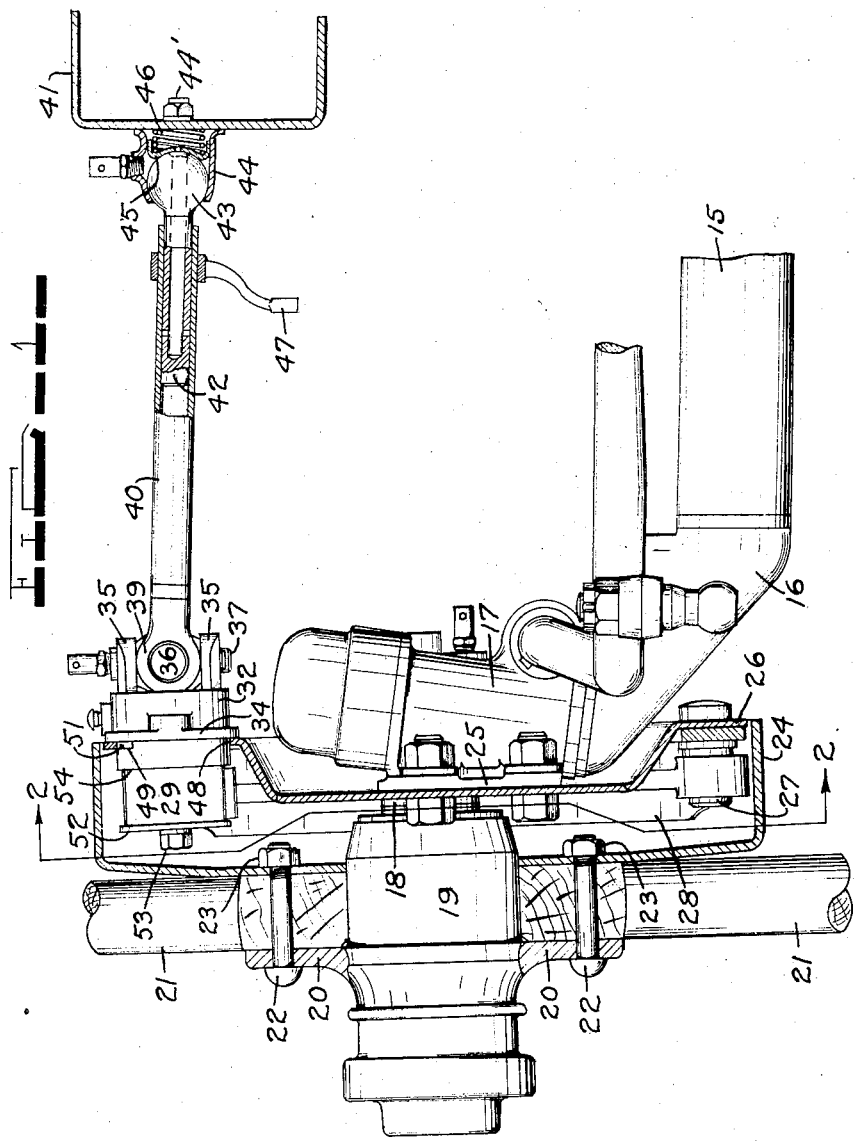
INVENTOR
GLA R. FULLER
BY
ATTORNEY Aug. 23, 1927.
G. R. FULLER
1,640,186
BRAKE
Filed May 8, 1926
3 Sheets-Sheet 2
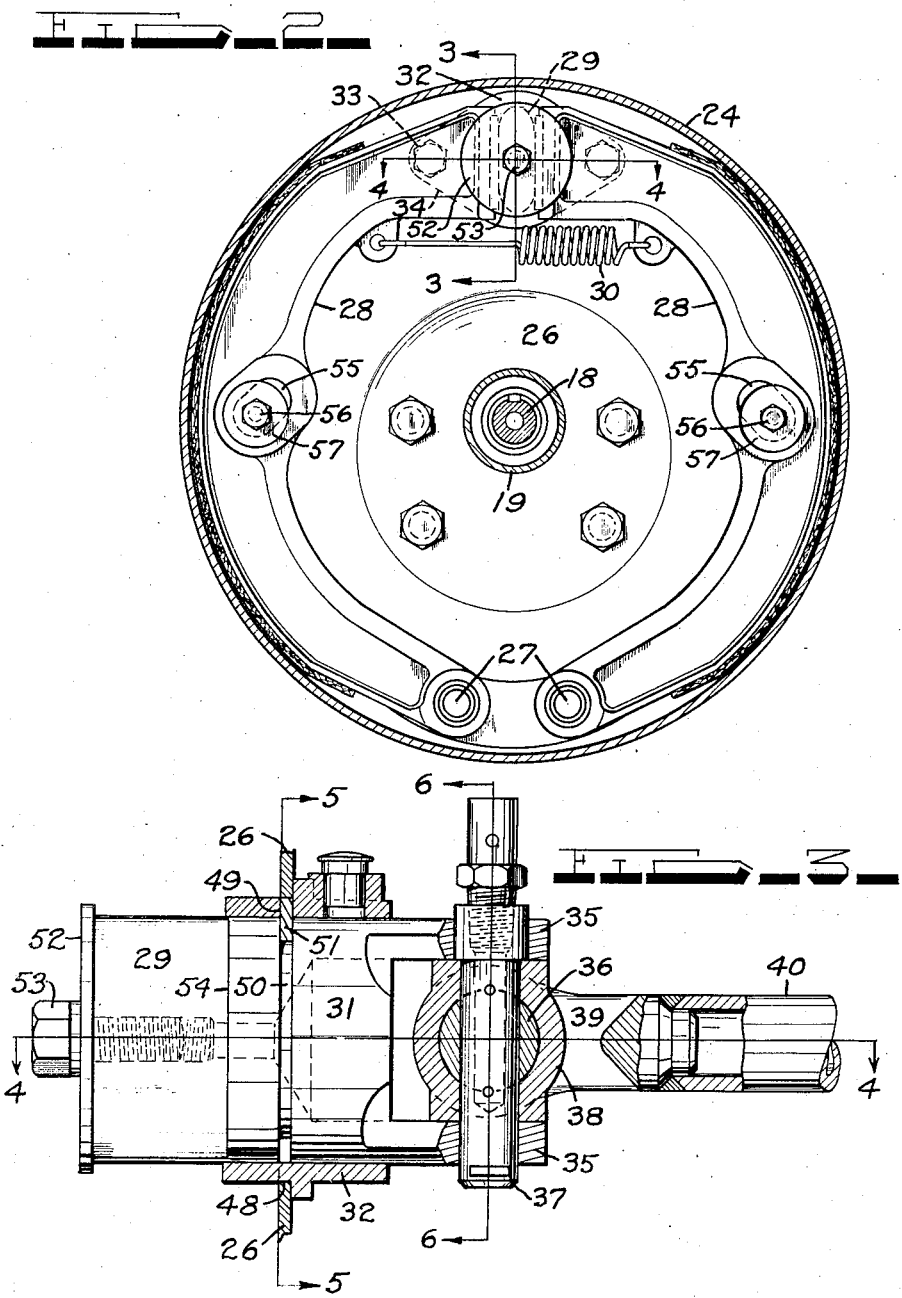
INVENTOR
GLA R. FULLER
BY
P. W. Pomeroy
ATTORNEY

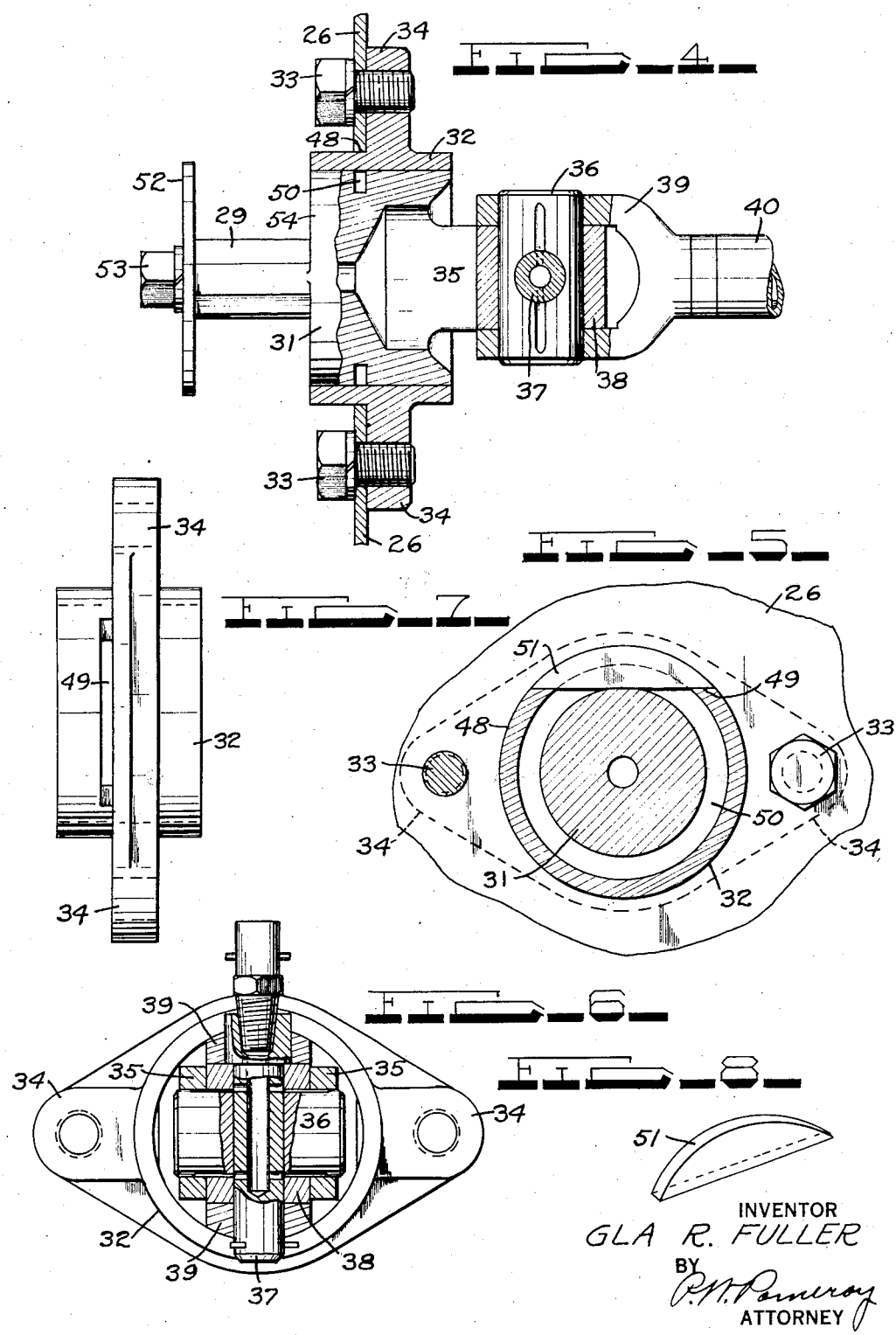

Patented Aug. 23, 1927.

1,640,186

UNITED STATES PATENT OFFICE.

GLA R. FULLER, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed May 8, 1926. Serial No. 107,683.

This invention relates to brake mechanism for motor vehicles, and particularly to means for holding parts of such mechanism from longitudinal movement while permitting rotational movement, the principal object being to provide a construction that is simple, efficient, and economical to manufacture.

Another object is to provide a simplified means for holding a rotatable brake shaft against longitudinal movement relative to its support.

Another object is to provide a slotted support for a rotatable grooved shaft, and a key received in the slot and projecting into the groove in the shaft whereby to prevent axial movement of said shaft.

A further object is to provide means for preventing axial movement of a rotatable shaft projecting through a supporting wall, comprising an opening in the wall, a bracket projecting through and engaging the walls of the opening and provided with flanged means engaging the surface of said wall, a rotatable shaft projecting through the bracket, a slot in the bracket normally closed by the walls of the opening, a groove in the shaft in line with the slot, and a key received in the slot and projecting into the groove and held from displacement by the walls of the opening.

Another object is to provide means for supporting the cam operating shaft at its outer end as defined in the preceding paragraph, and supporting the same at its inner end by a ball and socket connection, the ball having an extending stem telescopically receiving said shaft.

The above being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts through the several different views, Figure 1 is a fragmentary partially sectioned view of a motor vehicle front wheel brake mechanism taken vertically through the center of a front wheel thereof transversely of the length of the vehicle.

Figure 2 is a sectional view taken on the line 2—2 of Figure 1.

Figure 3 is a fragmentary partially sectioned view taken on the line 3—3 of Figure 2.

Figure 4 is a fragmentary partially sectioned view taken on the line 4—4 of Figures 2 and 3.

Figure 5 is a sectional view taken on the line 5—5 of Figure 3, showing with particular clearness the manner in which the locking key co-operates with the support, bracket and shaft to prevent axial movement of the shaft.

Figure 6 is a partially broken view taken transversely through the center of the universal joint of the mechanism, as on the line 6—6 of Figure 3.

Figure 7 is a plan view of the bracket showing the key receiving slot therein.

Figure 8 is a perspective view of the locking key used in conjunction with the rest of the mechanism.

The embodiment of the present invention in the drawings is shown in connection with the front wheel brake mechanism of a motor vehicle to which it is particularly adapted. In Figure 1 is shown a tubular front axle 15 provided with an end member 16 terminating in an upwardly extending pin (not shown) upon which the steering knuckle 17 is pivotally supported, the knuckle 17 being provided with an outwardly projecting wheel spindle 18 upon which the wheel hub 19 is rotatably supported. The hub 19 is provided with a flange 20 against which the wheel spokes 21 abut and which are secured thereto by the bolts 22 and the nuts 23 which also serve to support and secure the brake drum 24 to the hub 19 in concentric relation therewith. The knuckle 17 is provided with flanges 25 against which is secured the brake drum dust cover 26 in concentric relation with the drum 24, the cover 26 closing the open end thereof. Within the brake drum 24 and pivotally supported on the adjacent pins 27 secured to the dust cover 26 are the two brake shoes 28, the outer surfaces of which normally lie just out of contacting relationship with the inner surface of the drum 24, and whose free ends rest and are drawn against the expanding cam 29 by the spring 30 extending therebetween. The cam 29 is formed on the end of the short shaft 31 which projects through the dust cover 26 and is rotatably supported in the bracket 32 which also projects through the dust cover 26 and is secured thereto by the screws 33 which pass through the flanges 34 thereof.

The end of the shaft 31 opposite the cam 29 is formed to provide two arms 35 which serve as one yoke of a universal joint comprising cross pins 36 and 37, block 38, and yoke 39 formed on the end of the tubular operating shaft 40. The operating shaft 40 extends inwardly towards, and terminates short of, the vehicle side frame member 41, and is supported by the shaft 42 which is slidably received within the interior thereof, and the innner end of which is provided with a ball 43 which is universally supported on the frame 41 by the spherically surfaced bracket 44, the bracket 44 being secured to the frame 41 by the bolts 44'. A spherically surfaced button 45 backed by the spring 46 tends to hold the ball 43 firmly against the spherical seat of the bracket 44 and thereby prevent rattling of the same. A lever 47 is secured to the shaft 40 and is adapted to cause movement thereof when rotated about its axis, thereby acting to cause rotation of the cam 29 and spreading of the shoes 28 into contact with the drum 24 to effect a braking action on the wheel.

In constructions of this type, wherein the brake operating shaft is supported at one end on the frame of the vehicle and the other end on, or on a part supported by, the end of the axle, the distance between the point of support on the frame and on the axle varies with the movement of the axle relative to the frame, due both to vertical and harizontal movement of the springs which support the frame on the axle. The sliding joint between the shafts 40 and 42 is provided for compensating for this action, but it will be apparent that means must be provided for preventing axial displacement of the cam 29 which, were it not anchored against axial movement, might tend, with the shaft 40, to move axially during relative movement between the axle 15 and frame 41, particularly if undue friction developed between the shafts 40 and 42. The present invention deals in part with means for preventing such axial movement of the cam 29 as follows:

As has been described, the bracket 32 is secured to the dust cover 26, which supports it and which is relatively stationary in respect to the axle 15, by the screws 33 which pass through the dust cover 26 and into the flanges 34. As has also been described, the bracket 32 projects through the dust cover 26, it being guided and being located thereon by reason of the fact that the portion which projects through the dust cover 26 is in contacting relation with the walls 48 of the opening in the dust cover through which it projects. Its axial position in respect to the dust cover 26 is governed by the flanges 34 which are secured in abutting relation thereto. A slot 49 (see Figure 7 in particular) is cut through the wall of the bracket 32 immediately adjacent and on the drum side of the flanges 34, it preferably being of a width commensurate with the thickness of the cover 26, but this particular width is not imperative as will be apparent. It will now be evident that when the bracket 32 is assembled to the cover 26, the walls 48 of the opening in the dust cover 26 through which the bracket 32 projects, will close off the outer end of the slot 49, and will act as a cover therefor.

A circumferential groove 50 is cut in the periphery of the cam shaft 31 in line with the slot 49 when the parts are in properly assembled position relative to each other. In assembly, before the bracket 32 is inserted and secured to the cover 26, the cam 29 and shaft 31 are inserted in the bracket 32, the groove 50 is brought into alignment with the slot 49 and the key 51, (see Figure 8), is inserted in the slot 49 and projected into the groove 50. The key 51 is of substantially the same width as the slot 49 and groove 50, it having a sliding fit therein, and, as shown in Figure 5, has the shape of a sector of a circle, the radius of the circle being the same as the radius of that part of the bracket 32 in which it is received, and the depth being such that when the flat edge thereof seats in the bottom of the groove 50, the curved edge thereof is flush with the outer surface of the bracket 32 at the point where it is received. The bracket 32, cam 29 and cam shaft 31 and the key 51 assembled together as just described, are then positioned on and secured to the dust cover 26 in proper position as previously described. When in such assembled position it will be apparent that the walls 48 of the opening in the dust cover 26 through which the bracket 32 projects, and which covers the outer end of the groove 49 as previously described, will also cover the key 51 and prevent the same from becoming accidentally displaced. The key 51, thus being located in the slot 49 and groove 50. prevents the cam shaft 31 and cam 29 from moving axially in respect to the bracket 32 and likewise relative to the cover 26 and axle 15, although allowing the same to be freely rotatable in respect thereto. The simplicity of the construction is readily apparent as is also the ease with which it may be assembled and disassembled, all that is necessary in the latter case being to remove the screws 33 withdrawing the bracket 32 a slight amount and turing it over, upon which the key 51 will fall out and the shaft 31 and cam 29 may be pulled out of the bracket 32.

In such constructions it is usually the custom, if not necessary, to provide means for holding the free ends of the shoes from misalignment with the expanding cam. Advantage is taken of the axially immovable cam 29 in the present construction to accomplish this result which is done by securing a relatively large washer 52 on the end of the cam 29 by a screw 53 which is threaded axially thereinto, the free ends of the shoes 28 riding on the cam 29 between the washer 52 and the face 54 at the junction of the cam 29 and shaft 31, and being held in proper alignment with the cam 29 thereby. Additional means for guiding the shoes 28 may be provided, as shown in Figure 2, by slotting the shoes 28 adjacent their center as at 55 and passing a bolt such as 56 through the slot and into the cover 26, washers 57 being provided on the bolt 56 either side of the shoe 28 and preferably backed by a spring to resiliently hold them in such position.

Formal changes may be made in the specific embodiment of the invention described without departing from the spirit and substance of the broad invention, the scope of which is commensurate with the appended claims.

What I claim is:—

1. In combination, a support provided with an opening, a hollow bracket projecting through said opening provided with a slot through the walls thereof in line with the walls of said opening, a rotatable shaft in said bracket provided with a groove in line with said slot, and a key received by both said slot and said groove and held against displacement by the walls of said opening.

2. In combination with a supporting part provided with an opening, a bracket provided with a part received in and guided by the walls of said opening and provided with an abutment for governing the axial position thereof in respect to said support, an opening in said bracket extending within the walls of said support, a slot in said bracket extending radially to the last mentioned opening and communicating therewith and being outwardly closed by the walls of the first mentioned opening, a shaft received in said last mentioned opening, a circumferential groove in said shaft in line with said slot, and a key received in both said slot and said groove and prevented from displacement by the walls of said first mentioned opening.

3. In combination, a brake support, a hollow bracket projecting through an opening therein, a slot in the walls of said bracket in line with said support, a shaft rotatable in said bracket and provided with a groove in line with said slot, and a key received by said slot and projecting into said groove for preventing axial displacement of said shaft, said key being held from displacement by the walls of said opening.

4. In combination, a brake support provided with an opening, a bracket received in and guided by the walls of said opening and secured to said support, an opening through said bracket, a slot in said bracket in line with said support and extending from the outer surface thereof into the last mentioned opening, a shaft rotatably received in said last mentioned opening provided with a circumferential groove in line with said slot, and a key received in both said slot and said groove and prevented from displacement by the walls of the first mentioned opening whereby said shaft is held from axial movement.

5. In a braking mechanism for a motor vehicle, a brake support secured to an axle, brake shoes carried by said support, means for spreading said shoes comprising a shaft carried by a bracket on said support, means for preventing axial movement of said shaft comprising a key projecting through the walls of said bracket and engaging a groove in said shaft and held against displacement by the walls of said support, a brake operating shaft connected at one end for universal movement with the first mentioned shaft, and means for slidably and universally supporting the opposite end of said operating shaft on the frame of said vehicle comprising a third shaft slidably connected to said operating shaft and provided with a ball end received in a socket member secured to the frame of said vehicle, and a spring pressed button causing said ball to resiliently engage said socket member.

Signed by me at Detroit, Michigan, U. S. A., this 1st day of May 1926.

GLA R. FULLER.